United States Patent [19]

Hedgepeth

[11] Patent Number: 4,878,786
[45] Date of Patent: Nov. 7, 1989

[54] TINE BIT

[76] Inventor: Virgil E. Hedgepeth, 704 Hillcrest Dr., Bradenton, Fla. 34209

[21] Appl. No.: 247,346

[22] Filed: Sep. 21, 1988

[51] Int. Cl.$^4$ ............................................. B23B 51/04
[52] U.S. Cl. ...................................... 408/86; 408/211; 408/225
[58] Field of Search ................. 408/86, 213, 214, 226, 408/211, 212, 223, 224, 225, 227, 228

[56] References Cited

U.S. PATENT DOCUMENTS

| 613,132 | 10/1898 | Fellows | 408/214 |
| 679,406 | 7/1901 | Watson | 408/211 |
| 1,359,965 | 11/1920 | Claudon | 408/224 |
| 1,628,887 | 5/1927 | Spengler | 408/224 |
| 1,647,395 | 11/1927 | Costello | 408/224 |
| 4,147,464 | 4/1979 | Watson et al. | 408/226 X |

FOREIGN PATENT DOCUMENTS 1028501 7/1983 U.S.S.R. ............................... 408/213

Primary Examiner—Z. R. Bilinsky
Attorney, Agent, or Firm—Cushman, Darby & Cushman

[57] ABSTRACT

A drill bit is provided which has a central tine and first and second cutting tines, provided one on each side of the central tine. The lowermost end of each of the cutting tines is sharpened for cutting the stock. Thus the drill bit cores the material to form a hole thereby reducing the amount of material that must be cutaway. Further, the cutting tines are formed so as to have an enlarged distal head so that the main body portion of each of the tines has a slightly smaller cross-section than the cutting head. In this manner, friction can be reduced between the edges of the tines and the edges of the material being worked. Even further, the tine bit includes cutting blades between the central tine and the cutting tines in the event the stock is thicker than the length of the cutting tines.

15 Claims, 1 Drawing Sheet

U.S. Patent  Nov. 7, 1989  4,878,786
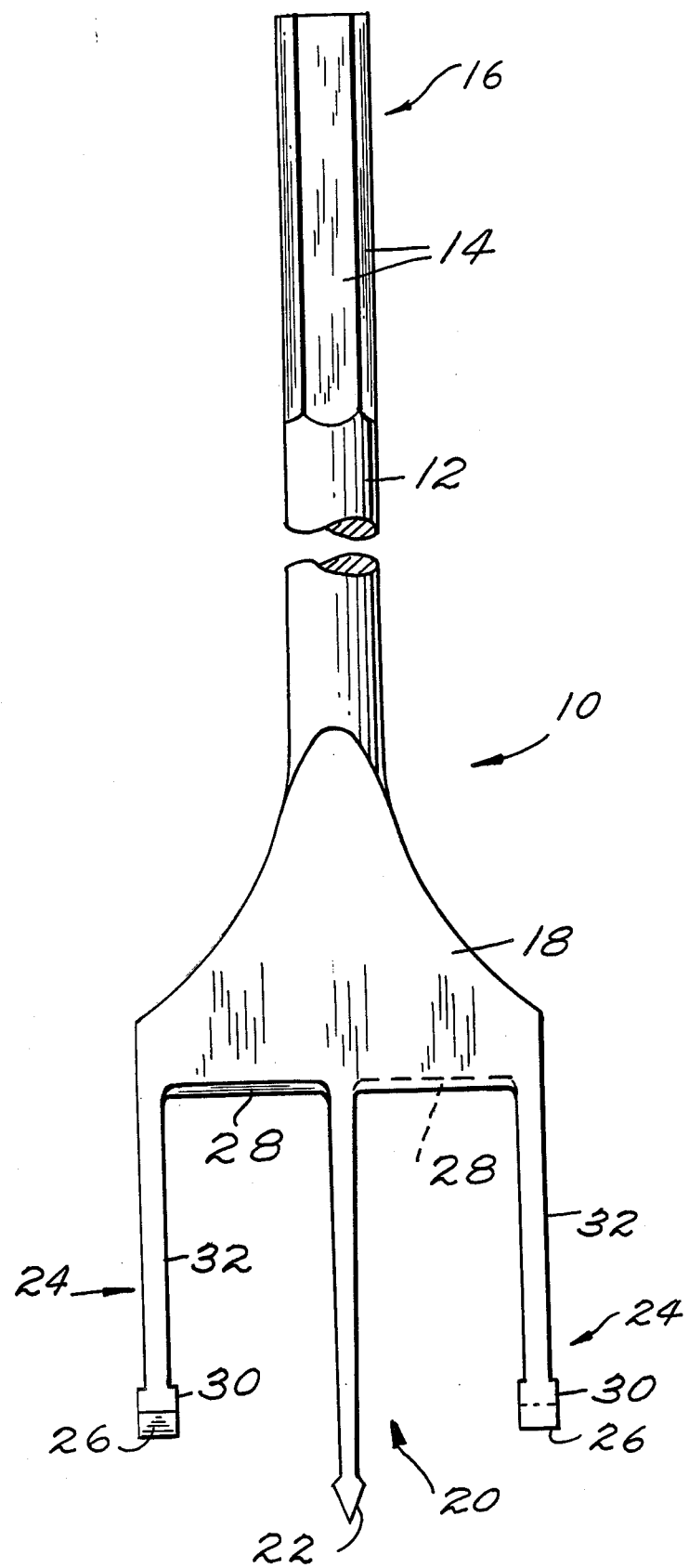

TINE BIT

BACKGROUND OF THE INVENTION

1. Field of the Invention

The present invention relates to drill bit and, more particularly, to a drill bit having an anchoring tine and two cutting tines for drilling holes by removing the material from the stock essentially as a solid core.

2. The Related Art

Heretofore numerous drill bit configurations have been developed in an effort to drill holes of an appropriate size quickly and in a manner which utilizes relatively little energy. Among the various drill bit configurations developed to date is the "spade bit" as, for example, is shown in U.S. Pat. No. 3,997,279.

The spade bit has a lead point design which is theoretically more energy efficient than the prior bits. Applicant has found, however, that the drill bit configurations heretofore developed including the spade bit have not been capable of effectively and quickly removing material in a energy efficient manner.

SUMMARY OF THE INVENTION

It is an object of the present invention to provide a bit for drilling holes which overcomes the deficiencies of the drill bits heretofore developed by operating faster and with less energy.

The foregoing objects are realized in accordance with the present invention by providing a drill bit having a central tine and first and second cutting tines, provided one on each side of the central tine. The lowermost end of each of the cutting tines is sharpened for cutting the stock. Thus the drill bit of the present invention cores the material to form a hole thereby reducing the amount of material that must be cutaway. Further, the cutting tines are preferably formed so as to have an enlarged distal head so that the main body portion of each of the tines has a slightly smaller cross-section than the cutting head. In this manner, friction can be reduced between the edges of the tines and the material being worked. In addition the drill bit so formed is easy to sharpen and formed from less material so that it is lighter in weight and potentially less expensive to manufacture than conventional drill bits. Even further, the tine bit preferably includes cutting blades between the central tine and the cutting tines in the event the stock is thicker than the length of the cutting tines.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings, all of which form a part of this specification, wherein like reference numerals designate corresponding parts in the various figures.

BRIEF OF THE DRAWINGS

FIG. 1 an elevational view of a three tine drill bit formed in accordance with the present invention.

DETAILED DESCRIPTION OF THE PRESENTLY PREFERRED EXEMPLARY EMBODIMENT

Referring to FIG. 1, the three tine bit formed in accordance with the present invention is shown generally at 10. The drill bit includes a shaft 12 which is substantially similar to prior art drill bit shafts and may include a series of planar faces 14 disposed about the circumferential surface of the proximal end 16 thereof to enable clamping of the drill bit by a power drill, hand operated drill or the like to effect rotation of drill bit 10.

As can be seen, three tines are provided on the enlarged distal end 18 of shaft 12 in the most preferred embodiment of the present invention. More particularly, a central tine 20 is provided which extends distally from distal end 18 of shaft 12 and is substantially co-axial with the axis of the main shaft.

The distalmost end or lead point 22 of central tine 20 is preferably defined as a point to effect anchoring of the drill bit relative to the stock being drilled. As can be seen central tine 20 is finer than those typically provided with prior art spade bits as it is only wide enough to stabilize the bit during operation.

First and second cutting tines 24 are mounted to distal end 18 of main shaft 12, one on each side of central tine 20. As can be seen, the distalmost end of each of these cutting tines 24 includes a traverse blade 26. These blades are sharpened as was the case with prior art spade bit cutting edges but with a keener edge. This is desirable as the amount of material being cut with tine bit 10 of the invention is much less than with standard bits and, with a keener edge, the tines 24 can accomplish the drilling of the hole in the stock with far fewer revolutions than would be needed for a spade bit to do the same job.

As can be further seen in FIG. 1, cutting blades 28 are defined on distal end 18 of shaft 12, between cutting tines 24 and central tine 20. These blades 28 facilitate the cutting of material which has a depth greater than the length of the cutting tines 24. The distal cutting edges 26, 28 are sharpened so as to define one sharpened edge as is illustrated by the solid and phantom lines in FIG. 1. Cutting blades 28 are sharpened at an angle consistent with the cutting edges of the prior art spade bits whereas cutting edges 26 are keener edged.

As can be even further seen in FIG. 1, the distal ends or heads 30 of the cutting tines 24 have a cross-section which is slightly greater than the main shaft portions 32 of each of the cutting tines 24. In this manner, the friction between the edges of the tines 24 and the stock being worked is reduced.

As is readily apparent, the wider the cutting edges 26 defined on the distalmost end of the cutting tines 24, the more energy is required to remove the core of material. However, the conservation of energy otherwise lost due to friction along the length of the tine shafts 32 is believed to be greater than the energy expended with the slightly increased diameter of the distal end 30. The arrow head design of the lead point 22 (shown in FIG. 1) is also a friction reducing feature as the main shaft of the central tine is spaced from the material being cut.

As is apparent from the foregoing, the narrower the main body of the cutting tines 24 and the heads 30, the less stock must be cut away and thus the less energy is required for the cutting process. Narrowing the tines beyond a certain point, however, increases the likelihood that the tines will fail under load. Nevertheless, the decreased resistance to load resulting from narrowing the tines can be accommodated to a certain extent by increasing the thickness of the entire working end of the tool or by adding mass to the trailing edges of the tines by increasing the thickness thereof.

While in the illustrated embodiment the anchoring tine 20 is centrally disposed, it is to be understood that the one or more cutting tines mounted to the head of the tool could be disposed on only one side of the lead point or unevenly distributed on either side of the lead point while still realizing the advantageous characteristics of this invention. Further, while it is contemplated that the tool is preferably formed from metal, it is to be understood that plastic, wood or any other sufficiently rigid material could be used therefor depending on the stock material being drilled. Similarly, the particular length and width of the central tine and the cutting tines would depend upon the stock being worked and the material used to make the bit and thus the illustrated proportions could be varied with out departing from my invention.

While the invention has been described in connection with what is presently considered to be the most practical and preferred embodiment, it is to be understood that the invention is not to be limited to the disclosed embodiment, but, on the contrary, it is intended to cover various modifications and equivalent arrangements included within the spirit and scope of the appended claims.

I claim:

1. A drill bit for drilling a bore in stock material comprising:
    an elongated main body member having a first, proximal end and a second, distal end;
    said distal end having a central tine element mounted thereto,
    said central tine element including a shaft portion having a longitudinal axis parallel to a longitudinal axis of said main body member and having a pointed distal end.
    said distal end of said central tine element having a maximum width greater than width of said shaft portion of said central tine element,
    said distal end of said main body member further having at least one cutting tine element mounted thereto,
    each said cutting tine element having a longitudinal axis parallel to the longitudinal axis of said central tine element and spaced therefrom,
    each of said cutting tines having a shaft portion and a sharpened distal end defining a cutting blade.
    said sharpened distal end of each said cutting tine element having a width greater than width of said shaft portion of said respective cutting tine element,
    said distal end of said main body member further including a cutting blade defined between said central tine element and each of said cutting tine elements.

2. A drill bit as in claim 1, wherein said proximal end includes means for coupling said main body member to a means for rotating said main body member about the longitudinal axis thereof.

3. A drill bit as as claim 2, wherein said main body member is an elongated rod.

4. A drill bit as in claim 3, wherein said means for coupling comprises a plurality of flat faces defined about the circumference of said proximal end for engagement with a clamping attachment device provided on a means for rotation.

5. A drill bit as in claim 1, wherein there are two cutting tine elements, one mounted on each side of said central tine.

6. A drill bit as in claim 1, wherein said longitudinal axis of said central tine element is coincident with said longitudinal axis of said main body member.

7. A drill bit as in claim 1, wherein said central tine element has a length greater than the length of each said cutting tine element.

8. A drill bit for drilling a bore in stock material comprising:
    an elongated main body member having a first, proximal end and a second, distal end;
    said distal end having a central tine element mounted thereto,
    said central tine element including a shaft portion having a longitudinal axis parallel to a longitudinal axis of said main body member and having a pointed distal end,
    said distal end of said central tine element having a maximum width greater than a width of said shaft portion of said central tine element,
    said distal end of said main body member further having at least one cutting tine element mounted thereto,
    each said cutting tine element having a longitudinal axis parallel to the longitudinal axis of said central tine element and spaced therefrom,
    each of said cutting tines having a shaft portion and a sharpened distal end defining a cutting blade, and
    further including a cutting blade defined on said distal end of said main body member between said central tine element and each said cutting tine element.

9. A drill bit as in claim 8, wherein said sharpened distal end of each said cutting tine element has a width greater than a width of said shaft portion of said respective cutting tine element.

10. A drill bit as in claim 8, wherein said proximal end includes means for coupling said main body member to a means for rotating said main body member about the longitudinal axis thereof.

11. A drill bit as in claim 10, wherein said main body member is an elongated rod.

12. A drill bit as in claim 11, wherein said means for coupling comprises a plurality of flat faces--defined about the circumference of said proximal end for engagement with a clamping attachment device provided on a means for rotation.

13. A drill bit as in claim 8, wherein said cutting tine elements are mounted on either side of said central tine.

14. A drill bit as in claim 8, wherein said longitudinal axis of said central tine element is coincident with said longitudinal axis of said main body member.

15. A drill bit as in claim 8, wherein said central tine element has a length greater than the length of each said cutting tine element.

* * * * *